(No Model.)

J. P. MERN.
TESTING PLUG.

No. 595,189. Patented Dec. 7, 1897.

Witnesses
E. N. Monroe
V. B. Hillyard

Inventor
John P. Mern,
By his Attorneys,
C. A. Snow & Co.

UNITED STATES PATENT OFFICE.

JOHN P. MERN, OF NEW YORK, N. Y., ASSIGNOR TO MICHAEL J. DRUMMOND, OF SAME PLACE.

TESTING-PLUG.

SPECIFICATION forming part of Letters Patent No. 595,189, dated December 7, 1897.

Application filed March 20, 1897. Serial No. 628,513. (No model.)

*To all whom it may concern:*

Be it known that I, JOHN P. MERN, a citizen of the United States, residing at New York, in the county of New York and State of New York, have invented a new and useful Testing-Plug, of which the following is a specification.

This invention relates to means for testing water and gas pipes, fire-hydrants, and castings used in connection with mains and pipes for conveying fluid or other medium from a reservoir, tank, or source to or along the required line of use.

The invention consists, essentially, of a plug composed of relatively movable parts having the outer portion of their meeting or opposing faces oppositely flared, forming a seat in which is fitted a rubber or compressible gasket or packing, and means for drawing the parts of the plug together for compressing the packing or gasket so as to compel it to grip the walls of the part to which the plug is fitted with such force as to hold the plug in place against pressure from within. A short pipe passes through the parts of the plug and is rigidly attached to one of the said parts and is movable with respect to the other part, whereby provision is had to secure a tight joint and yet admit of the parts moving toward and from each other to relax or compress the gasket or packing, as required. A passage or vent is provided for the escape of the air from the pipe or casting being tested and is supplied with a valve for closing the passage after the pipe or casting has been properly charged with the fluid used in the testing operation.

The invention further consists of the novel features and details of construction, which hereinafter will be more particularly set forth, illustrated, and finally embodied in the subjoined claims.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1:
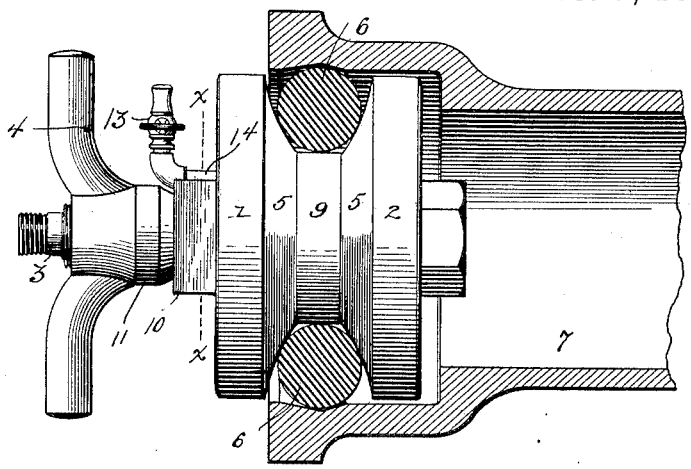
Figure 2:
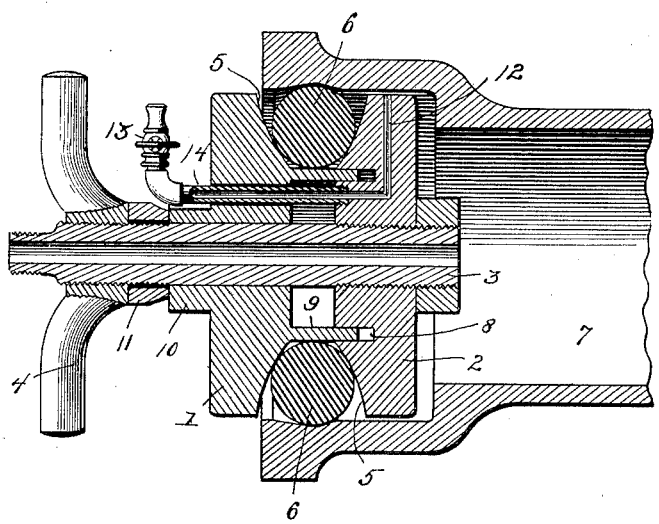
Figure 3:
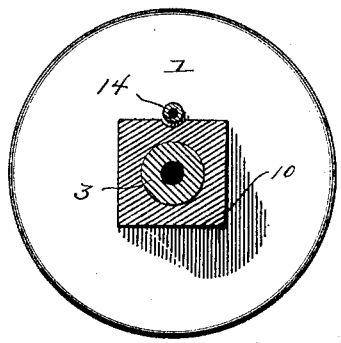

Figure 1 is a side elevation of a testing-plug constructed in accordance with this invention, the gasket or compressible packing-ring being shown in section and the plug fitted to the end of a pipe or main. Fig. 2 is a view similar to Fig. 1, showing the testing-plug in section. Fig. 3 is a section on the line X X of Fig. 1, looking to the right.

Corresponding and like parts are referred to in the following description and indicated in the several views of the drawings by the same reference-characters.

The testing-plug is composed of the parts 1 and 2, which are centrally apertured and connected by means of a short pipe 3, which is rigidly attached to one of the parts, as 2, and passes loosely through the part 1 and is threaded at its outer end to receive a hand or winged nut 4. The outer portion of the inner or opposing faces of the parts is flared, as shown at 5, forming a seat or annular channel for the reception of a rubber or compressible packing ring or gasket 6. By having the outer or edge portions 5 flaring outwardly the packing ring or gasket 6 is compressed and caused to move outwardly when drawing the parts 1 and 2 together and is brought forcibly into contact with the inner wall of the pipe 7, hydrant, main, or part to be tested, the degree of outward pressure being regulated by the extent of compression of the packing-ring. An annular groove 8 is formed in the inner face of one of the parts of the plug, and a corresponding flange 9 is provided on the inner face of the other part and obtains a snug fit in the groove 8, the latter being of sufficient depth to admit of the parts 1 and 2 being drawn together so as to compress the packing 6. The outer part 1 is formed with an angular boss 10, which is intended to receive a wrench or other tool, so as to hold the plug steady when turning the nut 4 to draw the parts 1 and 2 together when applying the device to the part to be tested. A washer 11 is interposed between the boss 10 and nut 4 and is loosely mounted upon the threaded portion of the pipe 3 and serves to transmit the pressure from the nut 4 to the part 1.

A vent or passage 12 extends inward from the edge of the part 2 to within a short distance of the pipe 3 and is deflected and extends outwardly about parallel with the said pipe and has a valve 13, by means of which it can be opened or closed as required. By having this vent or passage extend through the edge of the part 2 it occupies the highest point of the pipe 7 or part to be tested and enables all the air to escape when charging the pipe with water or other fluid. In order to allow for the relative movement of the parts 1 and 2, a small pipe 14 passes loosely through an opening in the part 1 and is connected at its inner end with the part 2 and forms a continuation of the passage 12, and this pipe carries the valve 13 at its outer end.

It will be understood that the testing-plug will be provided in various sizes and that the manner of connecting the pipe 3 with the part 2 is unimportant so long as a firm and rigid joint is obtained. When fitting the plug to the pipe or part to be tested, care should be exercised so as to have the inner end of the passage 12 occupy the highest position, and the plug is secured in place by drawing the parts 1 and 2 together by means of screwing up the nut 4 on the pipe 3.

The flange 9, in addition to supplementing the action of the pipe 3 in centralizing the parts 1 and 2, also sustains the inward pressure of the gasket or packing-ring 6 and forms an inner wall to the seat or annular channel in which the said packing-ring is fitted. After the plug is secured in place a gage, such as commonly used for testing, is fitted to the outer end of the pipe 3, and the pipe 7 or part to be tested is charged with water or fluid under pressure by forcing the same through the pipe 3 by means of a pump in the ordinary manner. As the water or fluid displaces the air the latter escapes through the passage 12, and when the pipe or part is fully charged the passage 12 is closed and the test conducted in the ordinary manner, after which the plug is removed by loosening the nut 4, as will be readily understood.

Having thus described the invention, what is claimed as new is—

1. In a testing-plug, the combination of relatively movable parts, the inner part having a passage extending inward toward the center from its outer edge, thence deflected outwardly toward the other part, a vent-pipe passing loosely through the outer part and across the space between the two parts and communicating with the inner end of the said passage, and having a cut-off valve, a compressible packing placed between the parts, and a short pipe centrally disposed and provided with means for drawing the parts together to expand the said packing and serving as a means for charging the part to be tested, substantially as described.

2. In a testing-plug, the combination of relatively movable parts having an outwardly-flaring seat formed between them, a compressible packing fitted in the said seat, a short pipe provided with means for drawing the movable parts together and serving as a means for charging the part to be tested, and a vent-pipe operating loosely through an opening in the outer part, extending across the space between the two parts, and connecting at its inner end with a passage formed in the inner part, and which passage extends through the edge portion of the part in which it is formed, substantially as and for the purpose set forth.

3. In a testing-plug comprising relatively movable parts having a seat or channel formed between them, a groove provided in the inner face of one of the said parts, a flange formed on the inner face of the other part and movable within the said groove, a compressible packing fitted in the said seat, and means for drawing the parts of the plug together, substantially in the manner and for the purpose set forth.

4. In a testing-plug composed of relatively movable parts having the outer portions of their inner or opposing faces oppositely flaring, forming a seat, a groove in the inner face of one part, a flange projecting from the inner face of the other part and operating in the said groove, and providing an inner wall to the said seat, a compressible packing located in the aforesaid seat, a pipe rigidly connected with the inner part of the plug and passing loosely through the other part, a nut mounted upon the said pipe for drawing the parts together, a passage extending inward from the edge of the inner part, and a valve-controlled pipe passing loosely through the other part and forming a continuation of the said passage, substantially as set forth.

In testimony that I claim the foregoing as my own I have hereto affixed my signature in the presence of two witnesses.

JOHN P. MERN.

Witnesses:
JNO. M. FRASER,
BERNARD J. McDERMOTT.